United States Patent [19]
Culley

[11] Patent Number: 5,463,761
[45] Date of Patent: Oct. 31, 1995

[54] EXTENDED DURATION HIGH RESOLUTION TIMER CONTAINED IN TWO INTEGRATED CIRCUITS AND HAVING ALTERNATING DATA SEQUENCES PROVIDED FROM DIFFERENT INTEGRATED CIRCUITS

[75] Inventor: Paul R. Culley, Cypress, Tex.

[73] Assignee: Compaq Computer Corp., Houston, Tex.

[21] Appl. No.: 955,500

[22] Filed: Oct. 2, 1992

[51] Int. Cl.⁶ ........................................ G06F 1/00
[52] U.S. Cl. ................ 395/550; 364/246.4; 364/270; 364/270.1; 364/270.3
[58] Field of Search ................ 364/246.4, 270, 364/270.1, 270.3; 395/550

[56] References Cited

U.S. PATENT DOCUMENTS

| | | | |
|---|---|---|---|
| 4,040,022 | 8/1977 | Takii | 364/900 |
| 4,201,337 | 5/1980 | Lewis et al. | |
| 4,993,028 | 2/1991 | Hillis | |
| 5,119,486 | 6/1992 | Albonesi | 395/425 |
| 5,206,865 | 4/1993 | Gruender, Jr. et al. | |

OTHER PUBLICATIONS

Wortzman, D., "Two Tier Error Correcting Code for Memories", IBM Technical Disclosure Bulletin, vol. 26, No. 1 OA, Mar. 1984, pp. 5314–5318.
Rao, T. et al., Error–Control Coding for Computer Systems, Prentice–Hall, 1988, pp. 221–298.
D. C. Bossen, B–Adjacent Error Connection, IBM J. Res. Develop., Jul. 1970 pp. 402–408.

Primary Examiner—Kevin A. Kriess
Assistant Examiner—Jonathan Hall Backentose
Attorney, Agent, or Firm—Pravel, Hewitt, Kimball & Krieger

[57] ABSTRACT

A computer system provides a 48-bit timer having 120 ns resolution and possessing a rollover period in excess of one year. The preferred embodiment includes two system data buffers (SDBs), each of which includes a full 48-bit timer. The timers are synchronized, and the output of each timer is provided to the host bus in alternating pairs of bits, so that half of the data bits are provided by the first SDB and half of the timer bits are provided by the second SDB. The timer may be read either as a 48-bit timer or a 32-bit timer.

5 Claims, 9 Drawing Sheets

| HOST DATA HD | TIMER COUNTER BITS | SDB CHIP A CHD | SDB CHIP B CHD |
|---|---|---|---|
| 31 | 34 | | 15 |
| 30 | 33 | | 14 |
| 29 | 32 | 15 | |
| 28 | 31 | 14 | |
| 27 | 30 | | 13 |
| 26 | 29 | | 12 |
| 25 | 28 | 13 | |
| 24 | 27 | 12 | |
| 23 | 26 | | 11 |
| 22 | 25 | | 10 |
| 21 | 24 | 11 | |
| 20 | 23 | 10 | |
| 19 | 22 | | 9 |
| 18 | 21 | | 8 |
| 17 | 20 | 9 | |
| 16 | 19 | 8 | |
| 15 | 18 | | 7 |
| 14 | 17 | | 6 |
| 13 | 16 | 7 | |
| 12 | 15 | 6 | |
| 11 | 14 | | 5 |
| 10 | 13 | | 4 |
| 9 | 12 | 5 | |
| 8 | 11 | 4 | |
| 7 | 10 | | 3 |
| 6 | 9 | | 2 |
| 5 | 8 | 3 | |
| 4 | 7 | 2 | |
| 3 | 6 | | 1 |
| 2 | 5 | | 0 |
| 1 | 4 | 1 | |
| 0 | 3 | 0 | |

| 1st SDB CHIP HOST DATA | | NOMENCLATURE ON SDB CHIP | | 2nd SDB CHIP HOST DATA | |
|---|---|---|---|---|---|
| 0 | 1 | 0 | 1 | 2 | 3 |
| 4 | 5 | 2 | 3 | 6 | 7 |
| 8 | 9 | 4 | 5 | 10 | 11 |
| 12 | 13 | 6 | 7 | 14 | 15 |
| 16 | 17 | 8 | 9 | 18 | 19 |
| 20 | 21 | 10 | 11 | 22 | 23 |
| 24 | 25 | 12 | 13 | 26 | 27 |
| 28 | 29 | 14 | 15 | 30 | 31 |
| 32 | 33 | 16 | 17 | 34 | 35 |
| 36 | 37 | 18 | 19 | 38 | 39 |
| 40 | 41 | 20 | 21 | 42 | 43 |
| 44 | 45 | 22 | 23 | 46 | 47 |
| 48 | 49 | 24 | 25 | 50 | 51 |
| 52 | 53 | 26 | 27 | 54 | 55 |
| 56 | 57 | 28 | 29 | 58 | 59 |
| 60 | 61 | 30 | 31 | 62 | 63 |

*FIG. 3A*

| 1st SDB CHIP EISA DATA | | NOMENCLATURE ON SDB CHIP | | 2nd SDB CHIP EISA DATA | |
|---|---|---|---|---|---|
| 0 | 1 | 0 | 1 | 2 | 3 |
| 4 | 5 | 2 | 3 | 6 | 7 |
| 8 | 9 | 4 | 5 | 10 | 11 |
| 12 | 13 | 6 | 7 | 14 | 15 |
| 16 | 17 | 8 | 9 | 18 | 19 |
| 20 | 21 | 10 | 11 | 22 | 23 |
| 24 | 25 | 12 | 13 | 26 | 27 |
| 28 | 29 | 14 | 15 | 30 | 31 |

*FIG. 3B*

| 1st SDB CHIP MEMORY DATA | | NOMENCLATURE ON SDB CHIP | | 2nd SDB CHIP MEMORY DATA | |
|---|---|---|---|---|---|
| 0 | 1 | 0 | 1 | 2 | 3 |
| 4 | 5 | 2 | 3 | 6 | 7 |
| 8 | 9 | 4 | 5 | 10 | 11 |
| 12 | 13 | 6 | 7 | 14 | 15 |
| 16 | 17 | 8 | 9 | 18 | 19 |
| 20 | 21 | 10 | 11 | 22 | 23 |
| 24 | 25 | 12 | 13 | 26 | 27 |
| 28 | 29 | 14 | 15 | 30 | 31 |
| 32 | 33 | 16 | 17 | 34 | 35 |
| 36 | 37 | 18 | 19 | 38 | 39 |
| 40 | 41 | 20 | 21 | 42 | 43 |
| 44 | 45 | 22 | 23 | 46 | 47 |
| 48 | 49 | 24 | 25 | 50 | 51 |
| 52 | 53 | 26 | 27 | 54 | 55 |
| 56 | 57 | 28 | 29 | 58 | 59 |
| 60 | 61 | 30 | 31 | 62 | 63 |
| 64 | 65 | 32 | 33 | 66 | 67 |
| 68 | 69 | 34 | 35 | 70 | 71 |
| 72 | 73 | 36 | 37 | 74 | 75 |
| 76 | 77 | 38 | 39 | 78 | 79 |
| 80 | 81 | 40 | 41 | 82 | 83 |
| 84 | 85 | 42 | 43 | 86 | 87 |
| 88 | 89 | 44 | 45 | 90 | 91 |
| 92 | 93 | 46 | 47 | 94 | 95 |
| 96 | 97 | 48 | 49 | 98 | 99 |
| 100 | 101 | 50 | 51 | 102 | 103 |
| 104 | 105 | 52 | 53 | 106 | 107 |
| 108 | 109 | 54 | 55 | 110 | 111 |
| 112 | 113 | 56 | 57 | 114 | 115 |
| 116 | 117 | 58 | 59 | 118 | 119 |
| 120 | 121 | 60 | 61 | 122 | 123 |
| 124 | 125 | 62 | 63 | 126 | 127 |
| CHECK BITS | | CHECK BITS | | CHECK BITS | |
| 0 | | 0 | | 0 | |
| 1 | | 1 | | 1 | |
| 2 | | 2 | | 2 | |
| 3 | | 3 | | 3 | |
| 4 | | 4 | | 4 | |
| 5 | | 5 | | 5 | |
| 6 | | 6 | | 6 | |
| 7 | | 7 | | 7 | |

FIG. 3C

| HOST DATA HD | TIMER COUNTER BITS | SDB CHIP A CHD | SDB CHIP B CHD |
|---|---|---|---|
| 51 | | | GND |
| 50 | | | GND |
| 49 | 47 | 23 | |
| 48 | 46 | 22 | |
| 47 | 45 | | 23 |
| 46 | 44 | | 22 |
| 45 | 43 | 21 | |
| 44 | 42 | 20 | |
| 43 | 41 | | 21 |
| 42 | 40 | | 20 |
| 41 | 39 | 19 | |
| 40 | 38 | 18 | |
| 39 | 37 | | 19 |
| 38 | 36 | | 18 |
| 37 | 35 | 17 | |
| 36 | 34 | 16 | |
| 35 | 33 | | 17 |
| 34 | 32 | | 16 |
| 33 | 31 | 15 | |
| 32 | 30 | 14 | |
| 31 | 29 | | 15 |
| 30 | 28 | | 14 |
| 29 | 27 | 13 | |
| 28 | 26 | 12 | |
| 27 | 25 | | 13 |
| 26 | 24 | | 12 |
| 25 | 23 | 11 | |
| 24 | 22 | 10 | |
| 23 | 21 | | 11 |
| 22 | 20 | | 10 |
| 21 | 19 | 9 | |
| 20 | 18 | 8 | |
| 19 | 17 | | 9 |
| 18 | 16 | | 8 |
| 17 | 15 | 7 | |
| 16 | 14 | 6 | |
| 15 | 13 | | 7 |
| 14 | 12 | | 6 |
| 13 | 11 | 5 | |
| 12 | 10 | 4 | |
| 11 | 9 | | 5 |
| 10 | 8 | | 4 |
| 9 | 7 | 3 | |
| 8 | 6 | 2 | |
| 7 | 5 | | 3 |
| 6 | 4 | | 2 |
| 5 | 3 | 1 | |
| 4 | 2 | 0 | |
| 3 | 1 | | 1 |
| 2 | 0 | | 0 |
| 1 | GND | | |
| 0 | GND | | |

FIG. 5A

| HOST DATA HD | TIMER COUNTER BITS | SDB CHIP A CHD | SDB CHIP B CHD |
|---|---|---|---|
| 31 | 34 |    | 15 |
| 30 | 33 |    | 14 |
| 29 | 32 | 15 |    |
| 28 | 31 | 14 |    |
| 27 | 30 |    | 13 |
| 26 | 29 |    | 12 |
| 25 | 28 | 13 |    |
| 24 | 27 | 12 |    |
| 23 | 26 |    | 11 |
| 22 | 25 |    | 10 |
| 21 | 24 | 11 |    |
| 20 | 23 | 10 |    |
| 19 | 22 |    | 9 |
| 18 | 21 |    | 8 |
| 17 | 20 | 9 |    |
| 16 | 19 | 8 |    |
| 15 | 18 |    | 7 |
| 14 | 17 |    | 6 |
| 13 | 16 | 7 |    |
| 12 | 15 | 6 |    |
| 11 | 14 |    | 5 |
| 10 | 13 |    | 4 |
| 9 | 12 | 5 |    |
| 8 | 11 | 4 |    |
| 7 | 10 |    | 3 |
| 6 | 9 |    | 2 |
| 5 | 8 | 3 |    |
| 4 | 7 | 2 |    |
| 3 | 6 |    | 1 |
| 2 | 5 |    | 0 |
| 1 | 4 | 1 |    |
| 0 | 3 | 0 |    |

FIG. 5B

EXTENDED DURATION HIGH RESOLUTION TIMER CONTAINED IN TWO INTEGRATED CIRCUITS AND HAVING ALTERNATING DATA SEQUENCES PROVIDED FROM DIFFERENT INTEGRATED CIRCUITS

BACKGROUND OF THE INVENTION

1. Field of the Invention

The present invention relates to timers in computer systems, and more particularly, to implementation of high resolution, extended duration performance timers used for software development.

2. Description of the Related Art

As computer systems have evolved, applications for computers have also developed and expanded. Modern programs often include literally millions, even billions, of instructions and operations to be performed by the computer system. Although the high performance of modern computer systems allows these programs to be efficiently executed, the programmer must nonetheless carefully design these programs to achieve maximum efficiency and waste minimal time.

To assist software developers, some computer systems include performance timers in the computer system hardware to allow programmers to determine how long a particular operation requires for execution. For example, a programmer can measure the duration of a direct memory access transfer by reading the current value of the performance timer, executing the sequence and then reading the elapsed time. By measuring the time required for various operations and routines, the performance timer provides an invaluable tool to the programmer for evaluating system performance.

Because of the high speed of modern computers, the duration of most computer operations is quite short. Consequently, a performance timer must have sufficient resolution to accurately indicate the duration of an operation. On the other hand, to prevent the timer from rolling over to its initial value and complicating the time calculations, a performance timer preferably measures over an extended interval before it rolls over. Providing extended duration and adequate resolution, however, demands a performance timer generating a tremendous number of timer bits, which requires considerable hardware.

A new computer system incorporating the present invention has a data buffer which is coupled to several buses, and each bus includes numerous data bits. Limitations on the number of pins that may be provided on a single chip presented a significant design obstacle for interfacing all of the buses on a single buffer. Pin requirements thus forced the data buffer in the new computer system to be divided into multiple devices to provide sufficient pins for all of the bus bits. In a separate invention, on which an application is being concurrently filed, the data bits present in the new computer system are provided to the data buffer devices in an interleaved fashion of alternating pairs, bits 0 and 1 to one device, bits 2 and 3 to a second device, bits 4 and 5 to the first device, and so on. This allowed use of simpler memory error detection and correction techniques as compared to prior art systems. This invention is detailed in application Ser. No. 07/955,923, entitled ERROR CORRECTION SYSTEM FOR N BITS USING ERROR CORRECTION CODE DESIGNED FOR FEWER THAN N BITS, filed concurrently herewith and hereby incorporated by reference.

In the new computer system, as described in more detail below, the data buffer devices were the only devices receiving a large number of data bits on the buses. However, the alternating pair arrangement of the data bits in the data buffer devices ruled out the use of a conventional timer located in one of the data buffers or even a simple cascaded timer had each buffer been used to provide much wider sections, such as 16 or 32 bit portions of the data word. Another alternative was to use a dedicated device including the timer function and having connections to a sufficient number of the data bits. But this adds to the cost and complexity of the computer system and so is undesirable. Therefore a new timer arrangement was necessary to allow development of a performance timer having the desired resolution and duration without using additional devices.

SUMMARY OF THE INVENTION

A computer system according to the present invention provides a 48-bit timer having a resolution of 120 ns and possessing a rollover period in excess of one year. The preferred embodiment of the computer system includes two system data buffers (SDBs) coupled to the system buses, and each SDB includes a full 48-bit timer. Each timer is synchronized with the other. Each timer provides half of its data bits to the bus to form a single 48-bit output. The outputs of the timers are provided to multiplexers on the SDBs, and the multiplexers are controlled by a set-up circuit that indicates which bits are to be transmitted to the bus from each timer. In the preferred embodiment, the timer bits are provided to the bus in alternating groups of two so that half of the data bits come from the first SDB and half of the timer bits come from the second SDB in alternating groups of two. When the timer is read, the timer bits transmitted by the multiplexers are latched and held until the entire timer value is read. Thus, all 48 bits of the timer may be read, although only a portion of the timer bits are generated by either SDB.

In addition, the 48-bit timer may be read as a 32-bit timer having 960 ns resolution. The timer system is memory mapped, and the 48-bit timer and the 32-bit timer may be accessed via different locations. Because the timer is memory mapped, high speed access is provided to the timer bits than the slower I/O access. Thus, the full 48 bits of the timer provide the system with an extended duration performance timer that rolls over less than once in a year of continuous counting, yet provides 120 ns resolution.

BRIEF DESCRIPTION OF THE DRAWINGS

A better understanding of the present invention may be obtained when the detailed description of the preferred embodiment is considered in conjunction with the following drawings, in which:

FIGS. 3A–3C are nomenclature tables for translating generic data bit designations for the SDB of the example to particular data bits for specific SDBs;

FIGS. 5A–5B illustrate connections between the host bus, the timer bits, and the SDBs supplying the timer bits for the 48- and 32-bit timers;

DETAILED DESCRIPTION OF THE PREFERRED EMBODIMENT

Figure 1:
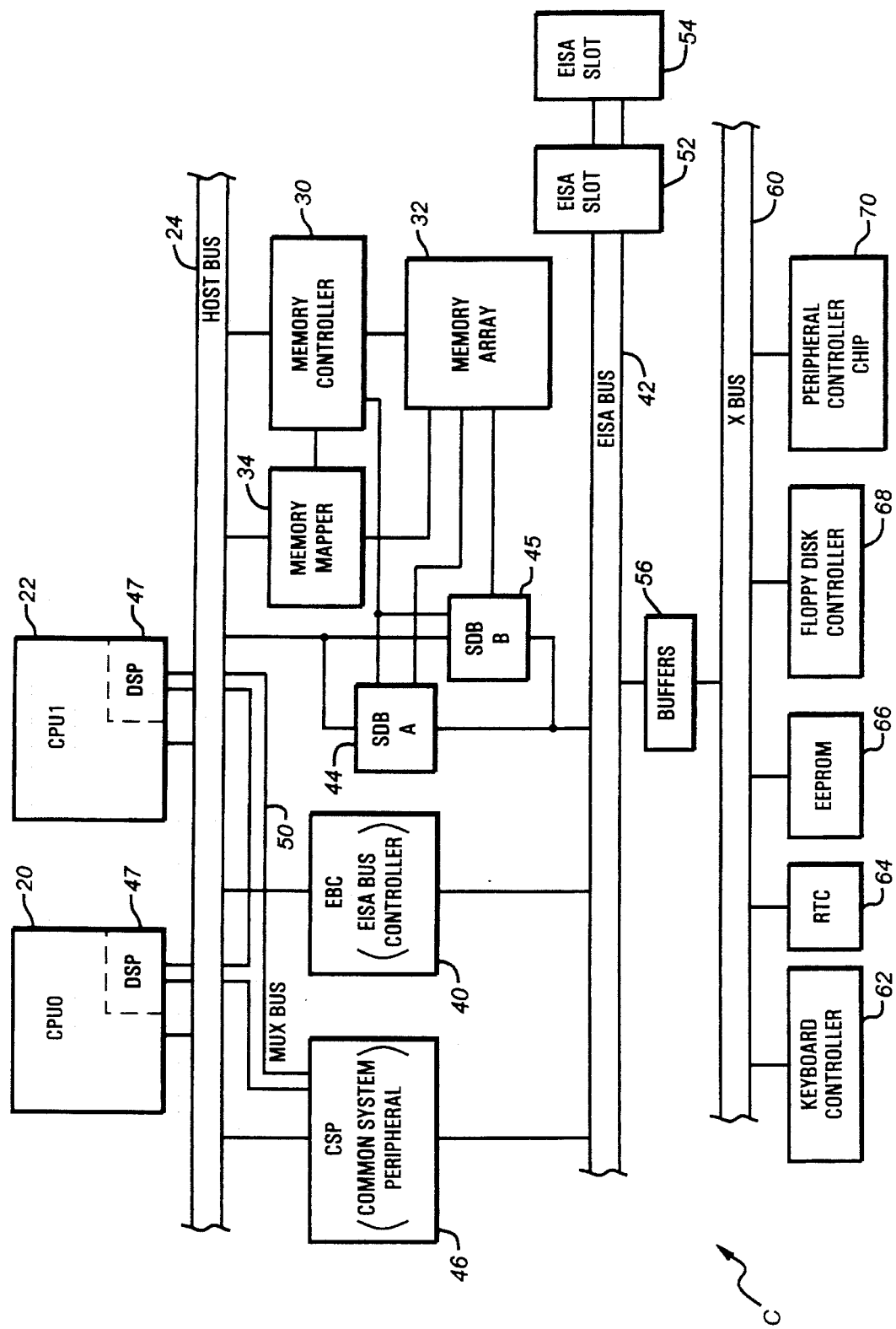
FIG. 1 is a block diagram of a multi-processor computer system incorporating the present invention.

Referring now to FIG. 1, a computer system C is shown. In the preferred embodiment, the computer system C is a multiprocessor system, although the present invention may be incorporated into single processor systems. The computer system elements that are not discussed in detail below are not significant to the present invention other than to illustrate the example of a fully configured computer system.

The computer system C includes two CPU boards referred to as CPU0 20 and CPU1 22 connected to a host bus 24. The host bus 24 includes address, data and control portions. Preferably the address portion is organized for 64 bit based addresses, with 8 byte lane enable signals and the data portion is 64 bits wide. A memory controller 30 is coupled to the host bus 24. A main memory array 32, preferably comprised of dynamic random access memory (DRAM), is coupled to the memory controller 30. Memory mapper logic 34 is coupled to the host bus 24, as well as the memory controller 30 and the memory array 32. The memory mapper logic 34 provides memory mapping functions to facilitate memory accesses in the memory array 32. A bus controller 40, referred to as the EISA bus controller (EBC), is coupled between the host bus 24 and an expansion bus, preferably an Extended Industry Standard Architecture (EISA) bus 42. The EBC 40 provides various bus cycle translation and conversion functions to facilitate transfers between the host bus 24 and the EISA bus 42. A pair of system data buffers (SDBs) 44, 45 is also coupled between the host bus 24 and the EISA bus 42, which are discussed in detail below. A logic block referred to as the common system peripheral (CSP) 46 is coupled between the host bus 24 and the EISA bus 42. The CSP 46 is also coupled through a MUX bus 50 to a logic block referred to as the distributed system peripheral (DSP) 47 associated with each of CPU0 20 and CPU1 22. The CSP 46 includes various common system function circuitry, including a direct memory access (DMA) controller, EISA arbitration controller, and numerous system board logic functions such as refresh control. The CSP 46 receives interrupt signals from the various peripheral I/O devices and transmits these interrupt request signals to the DSP logic 47 in each of CPU0 20 and CPU1 22 via the MUX bus 50. Each DSP 47 contains an interrupt controller, a timer/counter block as conventional in personal computer systems, portions of the DMA logic and various processor related functions. For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, which is hereby incorporated by reference. For more information on the CSP 46 and the DSPs 47, please see related copending application Ser. No. 07/955, 683, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, which is hereby incorporated by reference.

The EISA bus 42 includes a plurality of EISA slots 52 and 54 for receiving EISA expansion cards, for example, a network interface card, or a hard disk interface card. The EISA bus 42 is coupled through buffers 56 to a bus referred to as the X bus 60. A number of peripheral devices are coupled to the X bus 60, including a keyboard controller 62, a real time clock (RTC) 64, an electrically erasable programmable read only memory (EEPROM) 66, a floppy disk controller 68, and a peripheral controller chip 70 which includes numerous parallel ports and UARTs (universal asynchronous receiver/transmitters).

Figure 2:
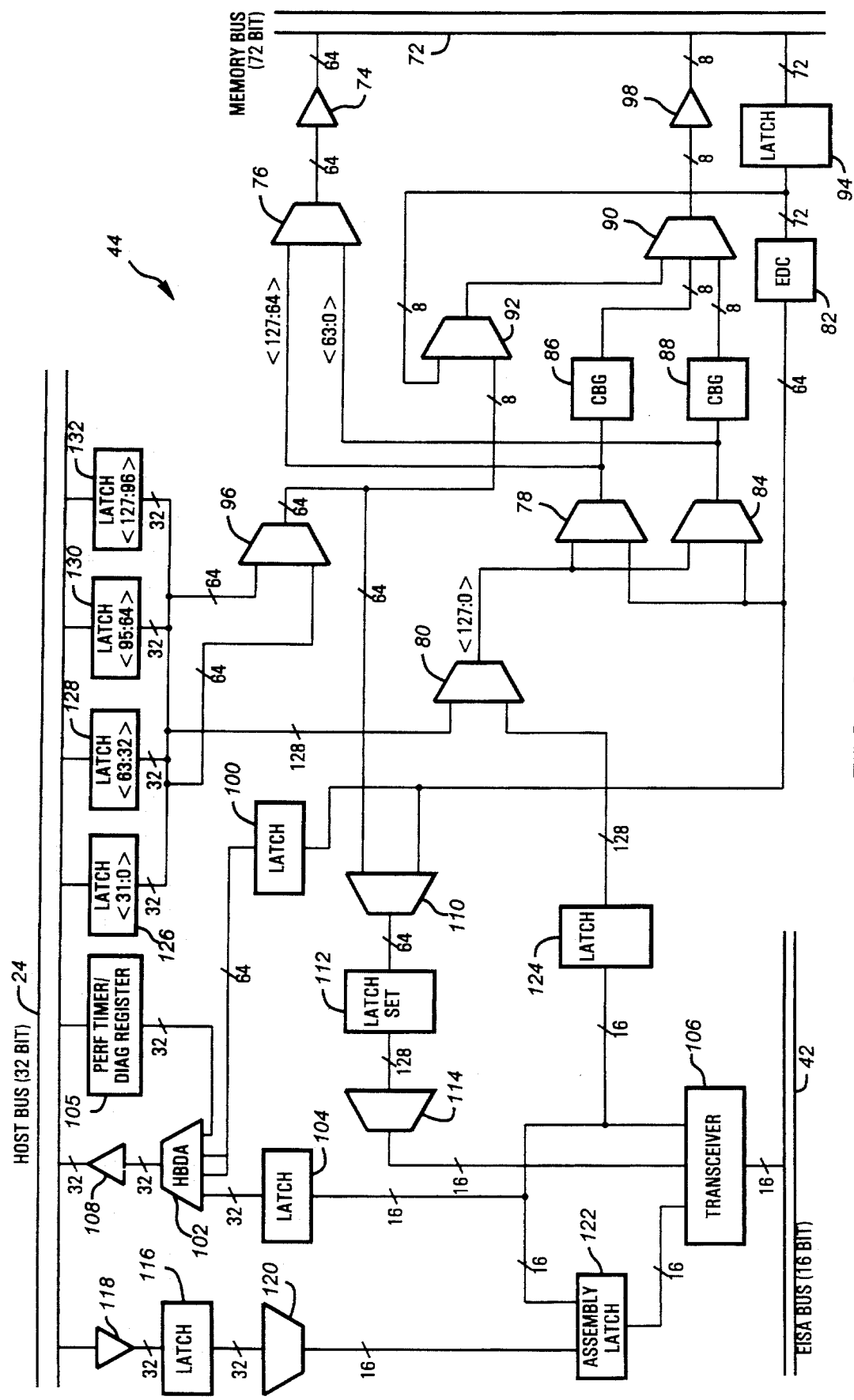
FIG. 2 is a block diagram of the System Data Buffer (SDB) circuit of FIG. 1.

Referring now to FIG. 2, a block diagram of one of the two SDBs discloses the SDB interface of the host bus 24, the EISA bus 42, and a memory bus 72 connected to the main memory array 32. Data is transferred from bus to bus through the SDBs 44, 45 in data words generally 256 bits wide. Because each SDB 44, 45 transmits only half of the data, data words in each of the SDBs 44, 45 are 128 bits wide. For purposes of the disclosure, each SDB 44, 45 is identical except for the specific bus signals received and transmitted. For write operations to the memory 32, sixty-four bits of data are transferred to the memory bus 72 from the SDB 44 by a buffer 74 having its data input connected to the output of a multiplexer 76. The multiplexer 76 input is connected to the output of another multiplexer 78 which receives the upper 64 bits of data from another multiplexer 80 and 64 data bits transmitted by an EDC circuit 82. The second input of the first multiplexer 76 is connected to the output of another multiplexer 84 which receives the lower 64 bits of data from the multiplexer 80 and the 64 data bits from an error detection and correction (EDC) circuit 82.

The 64-bit outputs of the multiplexers 78, 84 are also provided to a pair of check bit generators (CBGs) 86, 88. Each check bit generator 86, 88 generates eight check bits based on the input data bits so that single bit and adjacent double bit errors may be detected and corrected. The output of each check bit generator 86, 88 is provided to an input of another multiplexer 90, which has a third set of inputs connected to the output of a multiplexer 92. One of the multiplexer's 92 inputs is connected to the check bit output of a memory data read latch 94 which receives the stored check bits for a data word when the word is read from memory 32. The multiplexer's 92 other input is connected to the lower eight output bits of a multiplexer 96 which receives the upper 64 bits of the host bus data at one set of inputs, and the lower 64 bits of the host bus data at another set of inputs. The multiplexer 96 permits particular bits to be provided to the check bit memory without accessing the data bits in the memory 32. This allows the check bit memory to be tested independently of the data memory. The output of the multiplexer 90 is provided to an 8-bit buffer 98. The output of the buffer 98 is connected to the memory bus 72 to store the check bits in the memory array 32.

During read cycles from memory 32, data and check bits read from the memory bus 72 are latched by a 72-bit latch 94. The latched data and check bits are then provided to the EDC circuit 82. The EDC circuit 82 detects errors and provides corrected data when data is retrieved from memory 32. The EDC circuit 82 detects and corrects single bit and adjacent double bit errors. To transmit data to the host bus 24 from the memory bus 72, the data is first provided to a 64-bit memory-to-host read latch 100, having the upper 32 bits of its output connected to a first set of inputs of a host bus data multiplexer 102, and the lower 32 bits connected to a second set of inputs of the host bus data multiplexer 102. A third set of inputs of the host bus data multiplexer 102 is connected to a 32-bit EISA bus-to-host read latch 104 which receives data from an EISA transceiver 106. Finally, a fourth set of inputs receives data from the performance timer/ diagnostic register logic 105, which is discussed in detail below. The host bus data multiplexer 102 selects which 32 bits of data will be transmitted to a 32-bit buffer 108 having its outputs connected to the host bus 24 to drive data onto the host bus 24.

The output of the EDC circuit 82 is also provided to a memory-to-EISA bus read multiplexer 110 having two sets of inputs composed of 64 bits each. The first set of inputs receives data from the EDC circuit 82, and the other set of inputs receives data from the multiplexer 96. The output of the memory-to-EISA bus read multiplexer 110 is connected to the inputs of a set of memory-to-EISA bus read latches 112, which receive the data from the multiplexer 110 in sets of 64 bits. The latches 112 transmit the data to an EISA read multiplexer 114. The EISA read multiplexer 114 then transmits data to the EISA transceiver 106 in 16-bit sets. As the data is provided to the transceiver 106, the data is transmitted to the EISA bus 42.

The data from the EDC 82 is further provided to the multiplexers 78, 84 that drive data onto the memory bus 72. When a CPU 20, 22 or other bus master writes to memory 32, but not all of the bytes are valid, a read-merge-write command is executed. The data currently stored at the specified location in memory 32 is read, the retrieved data is partially overwritten by the data to be stored, and the merged data is finally presented on the memory bus 72. During a read-merge-write cycle, the check bit generators 86, 88 may be disabled and the check bits may be transferred from memory 32 to memory 32 without modification by switching the output of the multiplexers 90, 92 to transmit the latched check bits.

Data to be transferred from the host bus 24 to the EISA bus 42 is latched in a 32-bit host-to-EISA write latch 116 connected through a buffer 118 to the host bus 24. Data is then transmitted to a host-to-EISA write multiplexer 120, which transmits data to an EISA assembly latch 122 in 16-bit sets. The assembly latch 122 then transmits the data to the transceiver 106 to be provided to the EISA bus 42. The inputs of the assembly latch 122 are also connected to the outputs of the transceiver 106 for EISA byte assembly.

To transfer data from the EISA bus 42 to the host bus 24, data from the EISA bus 42 is collected by the transceiver 106 and provided in sets of 16 bits to the EISA bus-to-host read latch 104. The EISA bus-to-host read latch 104 is a 32-bit latch, which is connected to the third set of inputs of the host bus data multiplexer 102. As previously indicated, the multiplexer 102 transmits data to the host bus 24 through the 32-bit buffer 108.

Data to be transmitted to the memory bus 72 from the EISA bus 42 is loaded into the transceiver 106 and provided to a set of latches 124 in sets of 16 bits. When the transfer is complete, the 128-bit word is provided to the input of the multiplexer 80.

Similarly, data to be transmitted to the memory bus 72 from the host bus 24 is loaded in 32-bit sets into a set of four host-to-memory write latches 126, 128, 130, 132. The host-to-memory write latches 126, 128, 130, 132 receive data from the host bus 24 and transmit it to the second input of the multiplexer 80. Using the multiplexer's select input, the computer system C indicates which bus data is to be transferred to the memory bus 72.

The computer system C of the preferred embodiment employs two SDBs 44, 45. Because the SDBs 44, 45 are identical in every way except for the specific timer and data bits processed, the operation and function of only one SDB is described except where necessary to identify a distinct function of a particular SDB. Thus, the nomenclature used for the generic SDB described and the corresponding nomenclature for the individual SDBs 44, 45 of the preferred embodiment are shown in FIGS. 3A–3C. The host bus 24 data bits are split into groups of two bits and are alternatingly connected to the individual SDBs 44, 45 as illustrated in FIG. 3A, and the EISA bus 42 data bits are similarly split as shown in FIG. 3B. Furthermore, the data transmitted to and received by the memory 32 through each SDB 44, 45 is split in the same way, as illustrated in FIG. 3C, to correspond to the data received from the host bus 24 and the EISA bus 42. The various data bits are split in groups of two to permit enhanced error detection by the EDC 82. As noted above and in the incorporated application, the EDC 82 can correct adjacent two bit errors. By using alternating pairs of bits to the memory array 32 and properly connecting the memory devices in the memory array 32, an entire 4 bit wide DRAM can fail and yet the proper data be provided as one SDB corrects two bits and the other SDB corrects the other two bits. Although only two SDBs 44, 45 are shown in the preferred embodiment, any number of SDBs may be used. Similarly, although the preferred embodiment discloses connections in alternating pairs of data bits, any groups of bits, regardless of number, may be connected to the SDBs 44, 45.

As noted in the background, this interleaved arrangement complicates the development of a performance timer. The SDBs 44 and 45 are the only non-CPU devices having connections to the entire data portion of the host bus 24, so that they would be appropriate devices to receive the timer. However, the alternating bit connections, as described above, render a conventional timer arrangement impossible and the alternative of another device is undesirable. Thus the design of the present invention utilizing a complete timer in each SDB 44 and 45, with only appropriate data bits from each timer being provided was developed.

Figure 4:
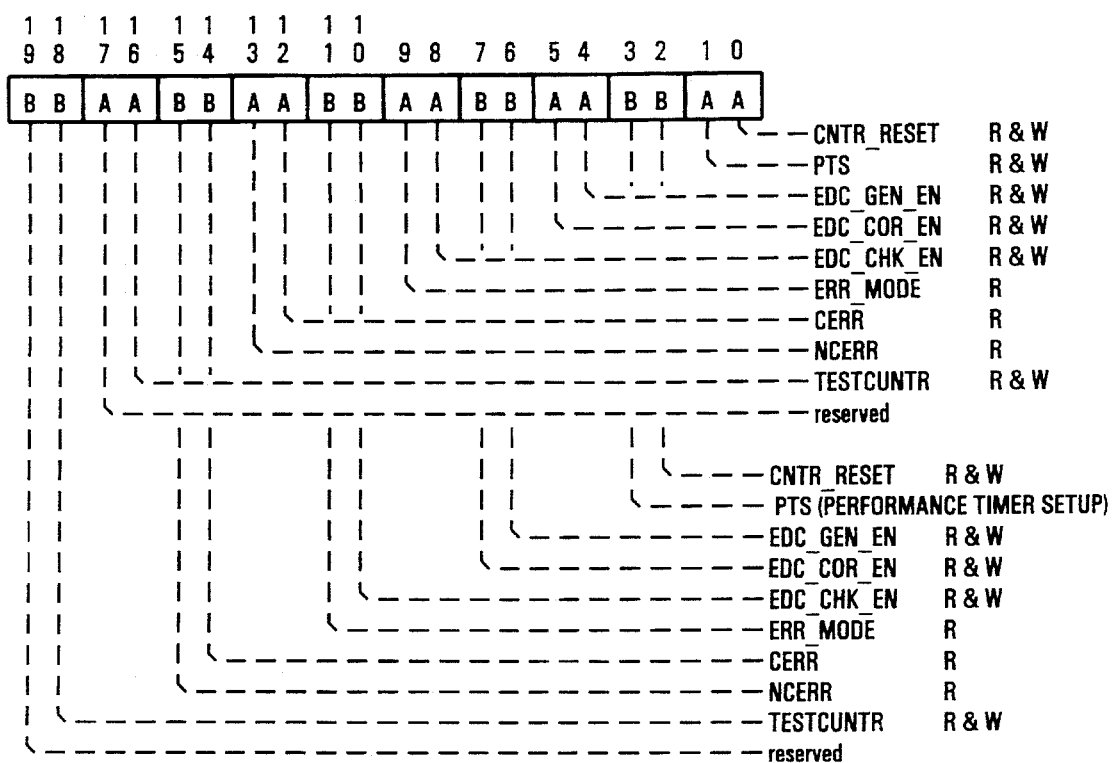
FIG. 4 illustrates a diagnostics register for controlling the performance timer and the EDC circuits of the present system.

Three signals, accessed through a diagnostic register in the performance timer/diagnostic register logic 105, control certain functions of the performance timer. The diagnostic register 105, which is shown in FIG. 4, is a memory mapped register used to control the memory error detection and correction logic 82, as well as control aspects of the performance timer 105. Like the buses 24, 42, 72, the diagnostic register 105 is split into two parts, so that data relating to SDBA 44 is stored in the SDBA portion of the register 105, and likewise for SDBB 45. Nonetheless, the diagnostic register 105 is accessible via a single address. The diagnostic register 105 provides control signals to the timer circuits according to the control bits stored in the diagnostic register 105. As shown in FIG. 4, the diagnostic register stores control bits for various other functions, split into groups of two for each SDB. The EDC_GEN_EN bits, stored in bits 4 and 6 for SDBA 44 and SDBB 45, respectively, enable and disable generation of check bits during memory writes by the check bits generators. The EDC_COR_EN bits, location in bits 5 and 7 of the register, enable and disable the error correction function of the EDC circuits in the SDBs. Similarly, the EDC_CHK_EN bits located in bits 8 and 10 of the register enable the error detection functions of the EDC circuits.

Six of the other bits in the register indicate error conditions detected by the EDC. The ERR_MODE bits in bits 9 and 11 of the register indicate whether an error detected by one of the respective EDC circuits was associated with a read operation or a read-merge-write operation. Likewise, the CERR and NCERR bit, located in bits 12, 14 and 13, 15, respectively, are asserted to indicate whether the detected error is correctable or non-correctable. Bits 17 and 19 are reserved for later development. For more information regarding the operation of the EDC system, please refer to application previously incorporated by reference.

To control the performance timer, the diagnostic register stores three more bits for each SDB. In particular, the diagnostic register 105 contains two performance timer setup (PTS) bits, at bits 1 and 3 of the diagnostic register for SDBA and SDBB respectively, so that one PTS bit corresponds to each SDB 44, 45. The PTS bits may be read or written, and both bits have power up values of 0. Generally, the PTS bit for SDBA is set to zero, and the PTS bit for SDBB is set to one to achieve the proper routing of signals from the performance timers 105. The PTS bits are provided to the performance timers 105 and direct data from the SDBs 44, 45, to the proper bits of the host data bus 24 according to the identities of the SDBs 44, 45 and the tables shown in FIG. 5A–5B. By storing a zero in bit 1 of the diagnostic register and a 1 in bit 3, the SDBs supply timer bits to the host bus 24 as shown in FIGS. 5A–5B.

Each SDB 44, 45 presents 24 timer bits to the host bus 24 when the 48-bit timer is read, and 16 timer bits when the 32-bit timer is accessed. Each bit is a bit of the 48-bit or 32-bit output of the timer, and which SDB 44, 45 bit corresponds to which timer output bit is controlled by the PTS signals. Thus, the PTS bits select the timer bits to be presented on the host data bus 24 by controlling bit routing for the 48-bit and 32-bit timers. The computer sets SDBB's 45 PTS bit to one, and therefore selects the bits under the SDBB column in FIGS. 5A–5B. Similarly, the PTS bit for SDBA 44 is set to 0, and the timer bits for SDBA 44, as shown in FIGS. 5A–5B, are presented on the host bus 24. Thus, to function properly, the PTS bits must be written with the proper values before the timer is used. In addition, the PTS bits may be read by other components in the system to determine the identity of each SDB 44, 45.

The second set of performance timer control bits in the SDB 44, 45 are the counter reset (CNTR_RESET) bits, stored in bits 0 and 2 of the diagnostics register. The diagnostic register contains two counter reset bits, one bit corresponding to each of the SDBs 44, 45. The counter reset bits may be read or written, and have a power up value of 0. If either of the counter reset bits is set to 1, the counter reset signal to the appropriate performance timer is asserted and the performance timer for the corresponding SDB 44, 45 is reset until the counter reset bit is changed to 0.

The third set of bits affecting the operation of the performance timer is a pair of test timer (TESTCUNTR) bits. The test timer bits may be read or written at bits 16 and 18 of the diagnostics register, and power up with values of 0. Either test timer bit may be set to 1 in order to assert a test timer signal to the appropriate performance timer and test its operation. The testing process is expedited so that each stage of the timer's counter may be tested simultaneously, as described below, to ensure that each stage counts and rolls over successfully. For normal operation, the test counter bit is returned to 0.

Figure 6:
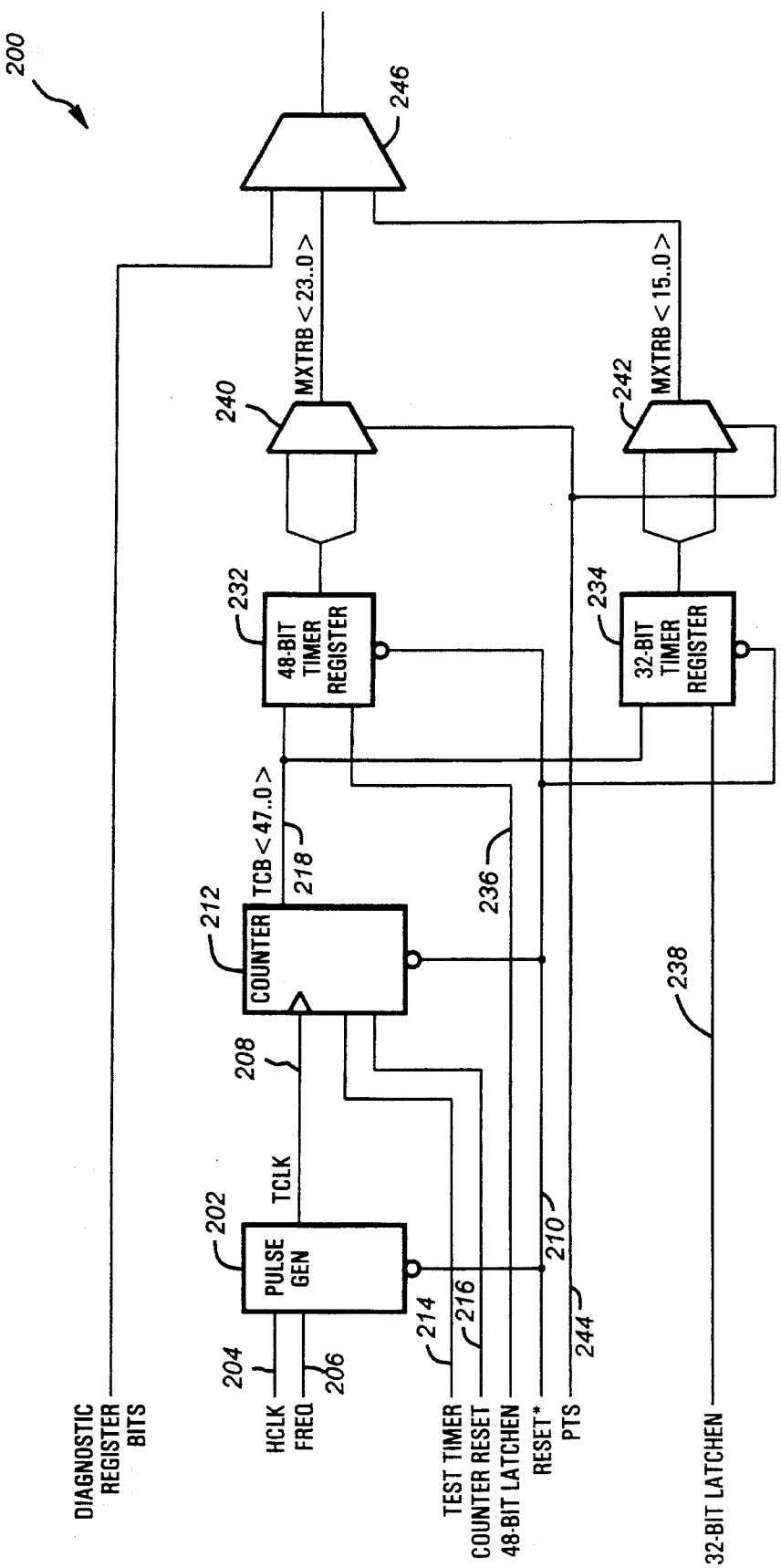
FIG. 6 is a block diagram of a timer circuit located in one of the SDBs.

Referring now to FIG. 6, a block diagram of the performance timer logic 200 in each SDB 44, 45 is shown. A pulse generator 202 receives a host bus clock (HCLK) signal 204 and a frequency (FREQ) signal 206. The frequency signal 206 is generated by the computer system C to indicate the frequency of the HCLK signal 204. In the computer system C of the preferred embodiment, a value of 0 indicates that the HCLK signal 204 is operating at 25 MHz and a value of 1 indicates an HCLK signal 204 frequency of 33.3 MHz. The pulse generator 202 uses the HCLK 204 and FREQ 206 signals to generate a timer clock (TCLK) signal 208, which changes state at the falling edge of the HCLK signal 204, and has a constant period of 120 nanoseconds (ns). The pulse generator 202 also receives the RESET* signal 210 asserted by the computer system C to reset the pulse generator 202 when the system C is reset.

Figure 7:
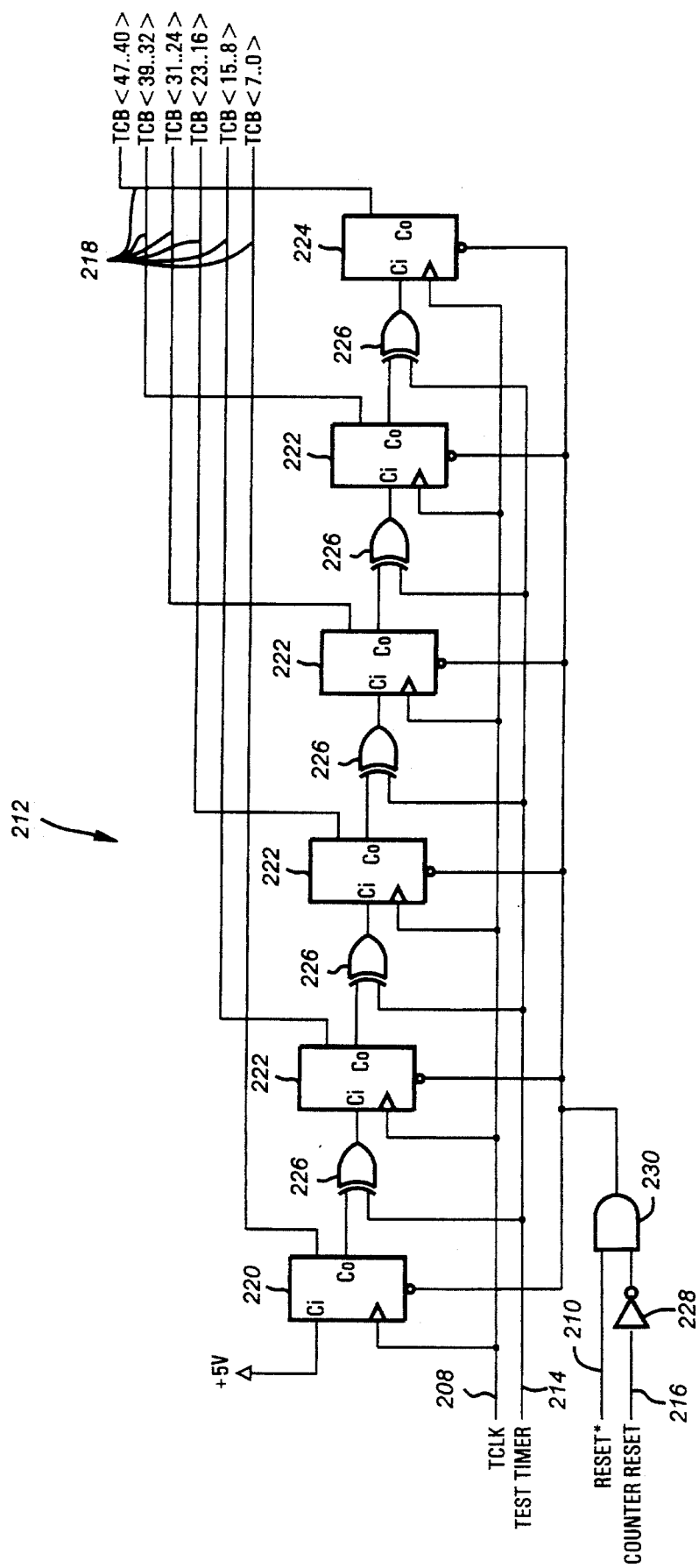
FIG. 7 is a block diagram of the counter of FIG. 6.

The TCLK signal 208 is provided to a counter 212, which also receives the test timer signal 214 and the counter reset signal 216 generated by the diagnostic register logic 105 according to the corresponding bits stored in the diagnostic register 105. The counter 212 also receives the RESET* signal 210 to reset the counter 212 when the system C is reset. The counter 212 generates 48 timer counter bits (TCBs) 218 and increments with every cycle of the TCLK signal 208. Referring now to FIG. 7, the 48-bit counter 212 comprises six individual 8-bit counters 220, 222, 224 in a cascaded configuration. Each 8-bit counter 220, 222, 224 generates eight TCBs 218 at its counter outputs. The first counter 220 generates the eight least significant TCBs 218, and the last counter 224 generates the eight most significant TCBs 218. The TCLK signal 208 is provided to the clock input of each individual 8-bit counter 220, 222, 224. Each 8-bit counter 220, 222, 224 also includes a carry input ($C_i$) so that upon each cycle of the TCLK signal 208 during which the signal asserted at the carry input is logic level high, the 8-bit counter 220, 222, 224 is incremented. The carry input of the least significant 8-bit binary counter 220 is permanently connected to a logic high signal so that it increments with every cycle of the TCLK signal 208.

The carry inputs of the remaining five 8-bit counters 222, 224 are connected to the outputs of exclusive OR (XOR) logic gates 226. The first input of each XOR gate 226 is connected to the test timer signal 214 generated by the diagnostic register 105. The other input of the XOR gate 226 is connected to the carry output of the preceding 8-bit counter 220, 222. When the test timer bit is set to one, the test timer signal 214 is driven high. If the carry output of each 8-bit counter 220, 222 is low, the carry input of each 8-bit counter 220, 222, 224 receives a high signal, and each of the 8-bit counters 220, 222, 224 simultaneously begins incrementing with each cycle of the TCLK signal 208. By resetting the system C to clear each 8-bit counter's 220, 222, 224 carry output, and then asserting the test timer signal 214 and checking the output of each of the 8-bit counters 220, 222, 224, the system C may check the operation of each 8-bit counter 220, 222, 224 for proper counting operation and successful rollover.

When an 8-bit counter 220, 222, 224 rolls over, the counter asserts a high signal at its carry output for the duration of a single TCLK signal 208 cycle. During normal operation, the test timer signal 214 is low, so that the high signal generated by the carry output is transmitted through the XOR gate 226 to the carry input of the next 8-bit counter 222, 224. When the high signal is received at the carry input, the 8-bit counter 222, 224 receiving the high signal is incremented. The carry output of the most significant stage 224 remains unconnected so that the 48-bit timer 200 will roll over when the final 8-bit counter 224 asserts its carry output. With the 120 ns period TCLK signal 208 of the preferred embodiment, the 48-bit counter 212 rolls over after approximately 390 days of continuous counting.

The counter circuit 212 also receives the RESET* signal 210 and the counter reset signal 216. The RESET* signal 210 is asserted by the computer system C upon a system reset, and the counter reset signal 216 is asserted by the diagnostic register 105. The counter reset signal 216 is inverted by an inverter 228 and provided to an input of an AND gate 230, and the other input of the AND gate 230 is connected to the RESET* signal 210. The output of the AND gate 230 is connected to a reset input for each 8-bit counter 220, 222, 224. The counters' 220, 222, 224 reset inputs are active low, so that if the RESET, signal 210 is driven low or the counter reset signal 216 is driven high, the output of the AND gate 230 is driven low and each of the 8-bit counters 220, 222, 224 is cleared.

Referring again to FIG. 6, the sequence of TCBs 218 generated by the 8-bit counters 220, 222, 224 comprise a 48-bit timer signal. All 48 TCBs 218 are provided to a 48-bit timer register 232, and TCBs 218 <34..3> are provided to a 32-bit timer register 234. The 48-bit timer register 232 also receives a 48-bit latch enable (LATCHEN) signal 236 asserted by decode logic in the memory controller 30 when the address for the 48-bit timer 200 is present during a read command. Preferably this is a memory address such as 80C00030h presented on the 64 bit host bus 24 during a 64 bit floating point read instruction. Similarly, the 32-bit timer register 234 receives a 32-bit LATCHEN signal 238 which is asserted by the memory controller 30 when a write command to the 32-bit timer address is asserted. Preferably this is a memory address such as 80C00038h presented on the host bus 24 during a conventional 32 bit read operation. When either of the LATCHEN signals 236, 238 is asserted, the TCBs 218 present at the inputs of the appropriate timer register 232, 234 are latched at the outputs of the timer register 232, 234. Because the computer system C requires two read operations to read the 48-bit timer register 232, the 48-bit LATCHEN signal 236 remains asserted until all of the bits have been read from the 48-bit timer register 232. On the other hand, the 32-bit timer register 234 may be read in a single read operation, so the extended LATCHEN signal is unnecessary. In addition, each timer register 232, 234 receives the RESET* signal 210 in order to clear the timer registers 232, 234 when the system C is reset.

The output of the 48-bit timer register 232 is provided to a 2:1 multiplexer 240, and the output of the 32-bit timer register 234 is provided to another 2:1 multiplexer 242. The outputs of the timer registers 232, 234 are split into groups of 2 bits each and are alternatingly provided to the data inputs of the multiplexers 240, 242, so that each multiplexer 240, 242 input receives every other set of two bits from the timer register 232, 234. The division of TCBs 218 to the 48-bit multiplexer 240 is illustrated by FIG. 5A, and the division of TCBs 218 provided to the 32-bit multiplexer 242 is illustrated by FIG. 5B. For example, if the timer 200 resides on SDBA 44, the multiplexer 240 outputs <23,22> are driven by TCBs <47,46>, whereas if the timer 200 is on SDBB 45, the multiplexer 240 outputs < 23,22> are driven by TCBs < 45,44>. The select inputs of the multiplexers 240, 242 receive a PTS signal 244 generated by the diagnostic register 105. The PTS signal identifies the SDB 44, 45 and, therefore, which half of the host bus 24 the SDB 44, 45 controls. Thus, the bits to be transmitted are controlled by the PTS signal 244. Using this configuration, SDBA 44 provides half of the TCBs 218 in groups of two, and SDBB 45 provides the remaining bits, so that all the bits are present in the proper order on the host data bus 24.

The output of each multiplexer 240, 242 is provided to an input of another multiplexer 246. The computer controls the multiplexer 246 according to address for the read command. The third input of the multiplexer 246 receives the diagnostic register's 105 contents. The output of the multiplexer 246 is connected to one of the inputs of the HBDA multiplexer 102, which provides data to the host bus 24.

The diagnostic register 105, the 48-bit timer register 232, and the 32-bit timer register 234 have individual memory mapped addresses. The bits in the diagnostic register 105 and the 48-bit and 32-bit timer registers 232, 234 may be read by any device controlling the host bus 24 via the HBDA multiplexer 102. Similarly, the diagnostic register 105 may be written to by asserting a write command with a proper address. Unlike the diagnostic register 105, however, the performance timer registers 232, 234 are read only registers. When the read command is asserted for one of the performance timer addresses, the proper latch enable signal 236, 238 to the performance timer 200 is asserted and the outputs are latched in the proper timer register 232, 234. The latched timer bits are transmitted through the PTS-controlled multiplexers 240, 242, the performance timer/diagnostic register multiplexer 246, and the HBDA multiplexer 102 to the host bus buffer 108 during the read operation. In this case, the buffer 108 is enabled when either of the LATCHEN signals are present and a read is occurring with the byte lane enable signals controlling presentation of the actual bytes onto the host bus 24. The values in the latches 232, 234 are maintained until the CPU 20, 22 reads all of the bits from the latches 232, 234, as indicated by byte lane enable signals presented on the host bus 24.

Figure 8A:
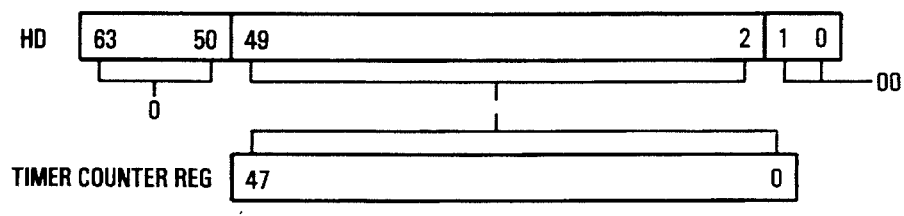
FIGS. 8A–8B illustrate the transfer of bits from the timer counter register to the host bus.
Figure 8B:
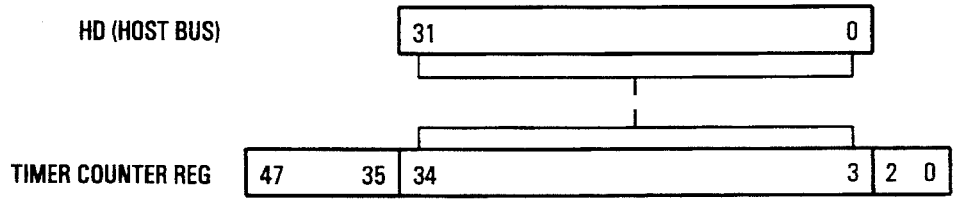

The bits from the timer register 232, 234 are loaded onto the host bus 24 as illustrated in FIGS. 8A–8B. The 48-bit timer register 232 bits are shifted by two digits when transmitted to the host bus 24 so that timer bit <47> is provided to host bus data bit <49>, and timer bit <0> is provided to host bus data bit <2>. Host bus data bits <63..50> and <1..0> of the 48-bit timer are provided with zeros. Due to the shift, actual time values are determined by multiplying the timer output by 30 ns, instead of the 120 ns resolution figure. As shown in FIG. 7B, when the 32-bit timer register 234 is accessed, TCBs <34..3> are provided to host bus data bits <31..0>. The value on the host bus 24 must be multiplied by 960 ns to provide an actual time value.

Thus, a computer system having a 48-bit timer as described in this application may time events with 120 ns resolution with only a minimal risk of the timer rolling over, thereby in most instances avoiding the need to track rollovers and perform complicated timing calculations. Because the performance timer is memory-mapped, access is quick enough that timer data is not stale when it is received. In addition, a dedicated chip is not required despite the split of the data buffer so that neither individual chip has access to the entire host bus.

The foregoing disclosure and description of the invention are illustrative and explanatory, and various changes in the size, shape, materials, components, circuit elements, wiring connections and contacts, as well as in the details of the illustrated circuitry and construction and method of operation, may be made without departing from the spirit of the invention.

I claim:

1. A computer system including an n bit timer addressable at a predetermined address, the computer system comprising:

an address bus for transmitting address signals, said address signals having a granularity defining a minimum data width;

a data bus for transmitting data, said data bus having a width of at least said minimum data width defined by said address signals;

means coupled to said address bus for indicating when the predetermined address of the timer is present;

a microprocessor connected to said data bus and said address bus for accessing the timer;

a first integrated circuit connected to said data bus; and a second integrated circuit connected to said data bus, said first and second integrated circuits connected to said data bus in an interleaved manner, whereby alternating data bit sequences of a predetermined width less than said minimum data width are coupled across said width of said data bus from said first and second integrated circuits to said data bus said first and second integrated circuits each containing an n bit timer, where n is greater than twice said predetermined width of said alternating bit sequence and each receiving said timer address present indication from said timer address present indication means, wherein when said first and second integrated circuits receive said timer address indication, said first and second integrated circuits provide the data bits of said n bit timer from their respective timers according to said interleaved manner of connection to said data bus.

2. The computer system of claim 1, wherein each n bit timer in said first and second integrated circuits includes an n bit counter and an n bit latch and wherein said counter value is latched in said n bit latch upon receiving said timer address indication for providing output to said data bus.

3. The computer system of claim 2, wherein said means for indicating when the predetermined timer address is present further indicates the presence of a second predetermined timer address;

wherein each n bit timer further includes an m bit latch, where m is less than n and is greater than twice said predetermined width of said alternating bit sequences and m bits of said n bit counter are latched into said m bit latch upon receiving said second timer address indication for output to said data bus; and wherein when said first and second integrated circuits receiving said second timer address indication, said first and second integrated circuits provide the data bits from said m bit latch of their respective timers according to said interleaved manner of connection to said data bus.

4. The computer system of claim 3, wherein n is 48, m is 32 and the predetermined width of said alternating bit sequence is 2.

5. The computer system of claim 1, further comprising:

means coupled to said address bus and said data bus for receiving an indication to clear said n bit timer in said first integrated circuit;

means coupled to said address bus and said data bus for receiving an indication to clear said n bit timer in said second integrated circuit; and wherein said first integrated circuit clears said n bit timer when said means receives an indication to clear; and wherein said second integrated circuit clears said n bit timer when said means receives an indication to clear.

* * * * *